(12) United States Patent
Boutaud (10) Patent No.: US 6,907,538 B1
(45) Date of Patent: Jun. 14, 2005

(54) CIRCUIT AND METHOD FOR PROVIDING CENTRALIZED SYNCHRONIZATION FOR THE TRANSPORTATION OF DATA BETWEEN DEVICES IN A DIFFERENT CLOCK DOMAINS ON A DATA BUS

(75) Inventor: Frederic Boutaud, Belmont, MA (US)

(73) Assignee: Analog Devices, Inc., Norwood, MA (US)

( * ) Notice: Subject to any disclaimer, the term of this patent is extended or adjusted under 35 U.S.C. 154(b) by 666 days.

(21) Appl. No.: 09/981,021

(22) Filed: Oct. 16, 2001

(51) Int. Cl.[7] ............................. G06F 1/12; H04L 7/00
(52) U.S. Cl. ....................... 713/400; 713/600; 375/354
(58) Field of Search ................................ 713/400, 600; 375/354, 355; 710/100, 305

(56) References Cited

U.S. PATENT DOCUMENTS

| 5,345,453 A | | 9/1994 | Bayer et al. |
| 5,602,878 A | | 2/1997 | Cross |
| 5,905,766 A | * | 5/1999 | Nguyen ..................... 375/354 |
| 6,260,152 B1 | * | 7/2001 | Cole et al. ................. 713/400 |
| 6,715,095 B1 | * | 3/2004 | Larsen et al. .............. 713/600 |

FOREIGN PATENT DOCUMENTS

| EP | 0 798 630 | | 3/1997 | |
| EP | 0 977 109 | | 2/2000 | |
| JP | 02183855 A | * | 7/1990 | ........... G06F/13/42 |

* cited by examiner

Primary Examiner—Dennis M. Butler
Assistant Examiner—Suresh Suryawanshi
(74) Attorney, Agent, or Firm—Gauthier & Connors LLP (57) ABSTRACT

Described is a system and method for centralized synchronization for the transportation of data between devices in different clock domains. In a preferred embodiment, synchronization logic synchronizes read data from an asynchronous peripheral to a bus clock. Rather than being located on each peripheral, the synchronization logic is located in the bus interface logic. When there is an indication that synchronization is needed for a peripheral, the synchronization logic samples the data bus twice or more and compares the values of consecutive data samples. If the data samples are equal, this data is returned to the bus master. If they are different, the data in the next cycle is returned to the bus master.

17 Claims, 7 Drawing Sheets

Figure 1

(Prior Art)

CIRCUIT AND METHOD FOR PROVIDING CENTRALIZED SYNCHRONIZATION FOR THE TRANSPORTATION OF DATA BETWEEN DEVICES IN A DIFFERENT CLOCK DOMAINS ON A DATA BUS

BACKGROUND OF THE INVENTION

The invention relates to the field of synchronizing asynchronous data, and in particular to synchronizing read data from an asynchronous peripheral to a bus clock.

Flip-flops are often used as storage elements in digital logic systems. Flip-flops sample their inputs on the rising or falling edge of the clock and continue to hold the sampled input as their output until the next clock edge. Because of the use of flip-flops in digital logic systems, metastability is an important design consideration that almost all designers of digital logic systems must contend with. When a flip-flop goes into a metastable state, its output is unknown and may be between a logic HIGH and a logic LOW, or may be oscillating. If the output does not resolve to a stable value before the next clock edge the metastable condition may be passed to other logic devices connected to the output of the flip-flop. Further, even if the output resolves to a stable value before the next clock edge, the value may be incorrect, causing invalid data to be passed to other logic devices connected to the output of the flip-flop. Metastability arises when a flip-flop input changes during the setup and/or hold time of a flip-flop.

In most digital logic systems, the inputs to the flip-flops do not change during the setup and hold times because the systems are designed as totally synchronous systems, which meet or exceed their components' specifications. In a totally synchronous design, the inputs to the flip-flops have a fixed relationship to the clock, i.e., they are synchronized to the clock. There are some systems, however, in which a totally synchronous design using a single master clock is not possible, or where certain advantages are gained from using an asynchronous design. In these systems, there is a need to interconnect subsystems that have no defined relationship between their clocks, i.e. different clock domains. This often results in a need to provide data from one of the clock domains as an asynchronous input to a flip-flop in the other clock domain. For these systems to function properly, there is a need to synchronize the incoming asynchronous input to the clock domain of the flip-flop. While described in relation to flip-flops, the metastable condition and its associated difficulties also applies to other types of storage elements in a digital logic system, such as latches or combinations of latches.

Figure 1:
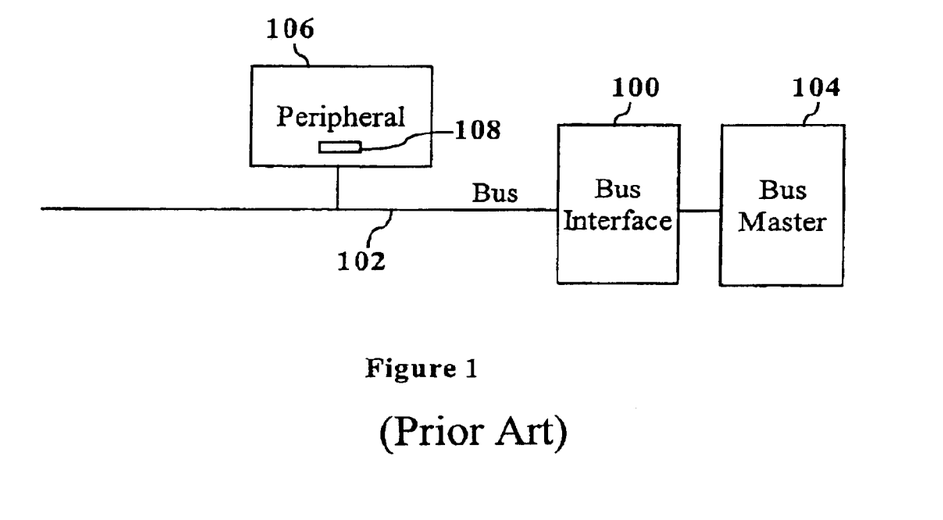
FIG. 1 illustrates a block diagram of a computer system having an asynchronous peripheral.

Such synchronization is often needed for transferring data from asynchronous peripherals to a bus master in a computer system. FIG. 1 illustrates a block diagram of a computer system having an asynchronous peripheral 106. Most modem bus systems provide some type of bus interface logic 100, which controls the transfer of data between a peripheral 106 and a bus master 104 using bus 102. Bus interface logic 100 operates in one clock domain, which may be synchronized to the clock domain of bus master 104. Peripheral 106, however, operates in its own clock domain, which is different from the clock domain of bus interface logic 100. Typically, the frequency of the clock domain of peripheral 106 is slower than the clock domain of bus interface logic 100. When data is being read from asynchronous peripheral 106, it places the data on bus 102. The data on the bus is then sampled using flip-flops set up as a register in either bus interface logic 102 or bus master 104.

Without synchronization of the read data to the bus clock, an asynchronous peripheral may place the data on the bus during the set-up and/or hold times of the flip-flops used by bus interface logic 100, causing one or more of them to go into a metastable state. Therefore, in most systems, peripheral 106 synchronizes the placement of data on bus 102 to the clock domain of bus interface logic 100 using synchronization logic 108 on peripheral 106. Peripheral 106 receives the bus clock and synchronization logic 108 synchronizes the placement of the read data on bus 102 with the bus clock.

Figure 2:
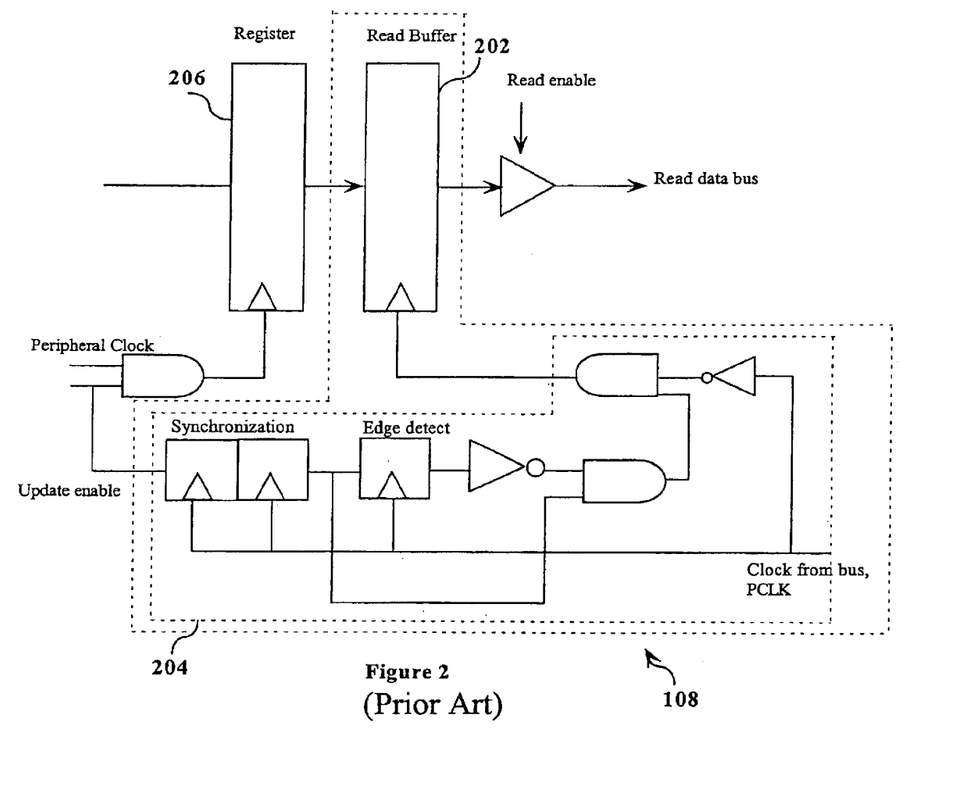
FIG. 2 illustrates prior art synchronization logic on a peripheral for outputting read data to a peripheral bus.

FIG. 2 illustrates typical logic on peripheral 106 for outputting read data to bus 102, including synchronization logic 108. For a peripheral to synchronize the data to the bus clock and provide a stable value on the bus, synchronization logic 108 generally requires a read buffer 202 that isolates the internal data change/update inside the peripheral from the read data driven onto the bus. An update_enable signal is asserted to read data that is to be placed on the bus into an internal register 206. Generally, the update_enable signal is long enough to be synchronized to bus clock. However, some applications may use a short update_enable signal with logic that extends the update_enable signal for proper synchronization to the bus clock. Logic 204 then synchronizes the update_enable signal with the bus clock so that the data is transferred to read buffer 202 and, consequently, placed upon the bus in a manner synchronized to the bus clock.

Synchronization performed on each peripheral, however, is disadvantageous because synchronization logic is needed on each peripheral. Further, when synchronization is performed by each peripheral, synchronization is decentralized and not necessarily performed the same way for each peripheral. It would therefore be advantageous to be able to provide stable, valid data from an asynchronous peripheral to a bus master without requiring each peripheral to synchronize its output to the bus clock. More generically, it would be advantageous to provide centralized synchronization for the transportation of data between devices in different clock domains.

SUMMARY OF THE INVENTION

One aspect of the present invention provides a circuit for synchronized transportation of data from a first device having a first clock domain to a second device having a second clock domain. The circuit comprises a data register to sample data placed on a data bus by the first device during a first bus clock cycle and a comparator to compare data on the data bus during a second, consecutive bus clock cycle to the data sampled by the data register. The circuit also comprises a multiplexor to output the sampled data to the second device during a third, consecutive bus cycle when the sampled data is equal to the data on the data bus during the second, consecutive bus clock cycle and to output data on the data bus to the second device during the third, consecutive bus clock cycle when the sampled data is not equal to the data on the data bus during the second bus clock cycle.

Another aspect of the present invention provides a method for synchronized transportation of data from a first device having a first clock domain to a second device having a second clock domain. Data placed on a data bus by the first device is sampled during a first bus clock cycle. Data on the data bus during a second consecutive bus clock cycle is compared to the sampled data. When the sampled data is equal to the data on the data bus during a second consecutive bus clock cycle, the sampled data is output to the second device during a third consecutive bus cycle. When the sampled data is not equal to the data on the data bus during the second consecutive bus clock cycle, data on the data bus during the third consecutive bus clock cycle is output to the second device.

Another aspect of the present invention provides a computer comprising an asynchronous peripheral that transmits read data to a bus master by placing the read data on a peripheral bus and bus interface logic to synchronize the read data. The bus interface logic comprises a data register to sample read data on the peripheral bus during a first bus clock cycle; a comparator to compare read data on the peripheral bus during a second consecutive bus clock cycle to the sampled read data; and a multiplexor to output the sampled read data during a third consecutive bus cycle when the sampled read data is equal to the read data on the data bus during a second consecutive bus clock cycle and to output read data on the data bus during the third consecutive bus clock cycle when the sampled read data is not equal to the read data on the data bus during a second consecutive bus clock cycle.

DETAILED DESCRIPTION OF THE INVENTION

While the present invention will be described in relation to a preferred embodiment of synchronization between a peripheral and a bus master in a computer system, it is not limited thereto. The present invention is envisioned as being applicable to the transportation of digital data from any source device with a first clock domain to any destination device with a second clock domain.

Figure 3:
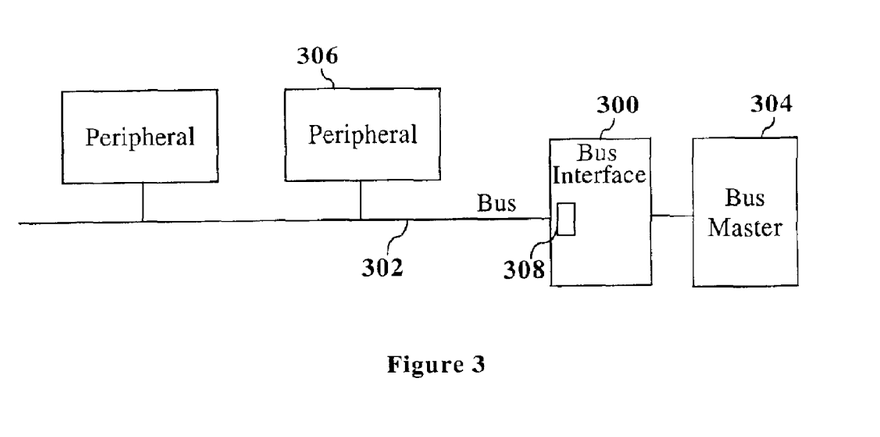
FIG. 3 illustrates a block diagram of a computer system according to the present invention, which has an asynchronous peripheral.

FIG. 3 illustrates a block diagram of a computer system according to the present invention, which has an asynchronous peripheral 306. The computer system according to the present invention is similar to the computer system of FIG. 1. As with the computer system of FIG. 1, the computer system according to the present invention has bus interface logic 300, which controls the transfer of data between a peripheral 306 and a bus master 304 using bus 302. Bus interface logic 300 operates in one clock domain, which is usually synchronized to the clock domain of bus master 304. Peripheral 306, however, operates in its own clock domain, which is different from the clock domain of bus interface logic 300. The frequency of the clock of peripheral 306 is typically, although not always, slower than the clock of bus interface logic 300. Asynchronous peripheral 306, however, does not change the read data faster than the frequency of the clock of bus interface logic 300. When data is being read from peripheral 306, it places the data on bus 302 and bus interface logic 300 uses flip-flops configured as a register to sample the data. However, instead of having synchronization logic in each peripheral, logic 308 is built into bus interface logic 302 to insure that data read from bus 102 is valid and stable before it is passed to bus master 304.

Therefore, for a read from peripheral 306, peripheral 306 places read data onto bus 302 asynchronously from the bus clock. Logic 308 then insures valid data is passed to bus master 304 by implementing the method illustrated in FIG. 4. As illustrated, logic 308 first determines that peripheral 306 is asynchronous (step 400). Logic 308 then samples the data peripheral 306 places on the bus twice or more (step 402). Logic 308 compares the values of consecutive data samples (step 404). If the data samples are equal, the sampled data is returned to bus master 304 as valid data (step 406). If they are different, the data in the next cycle is returned to bus master 304 as valid data (step 408).

Figure 4:
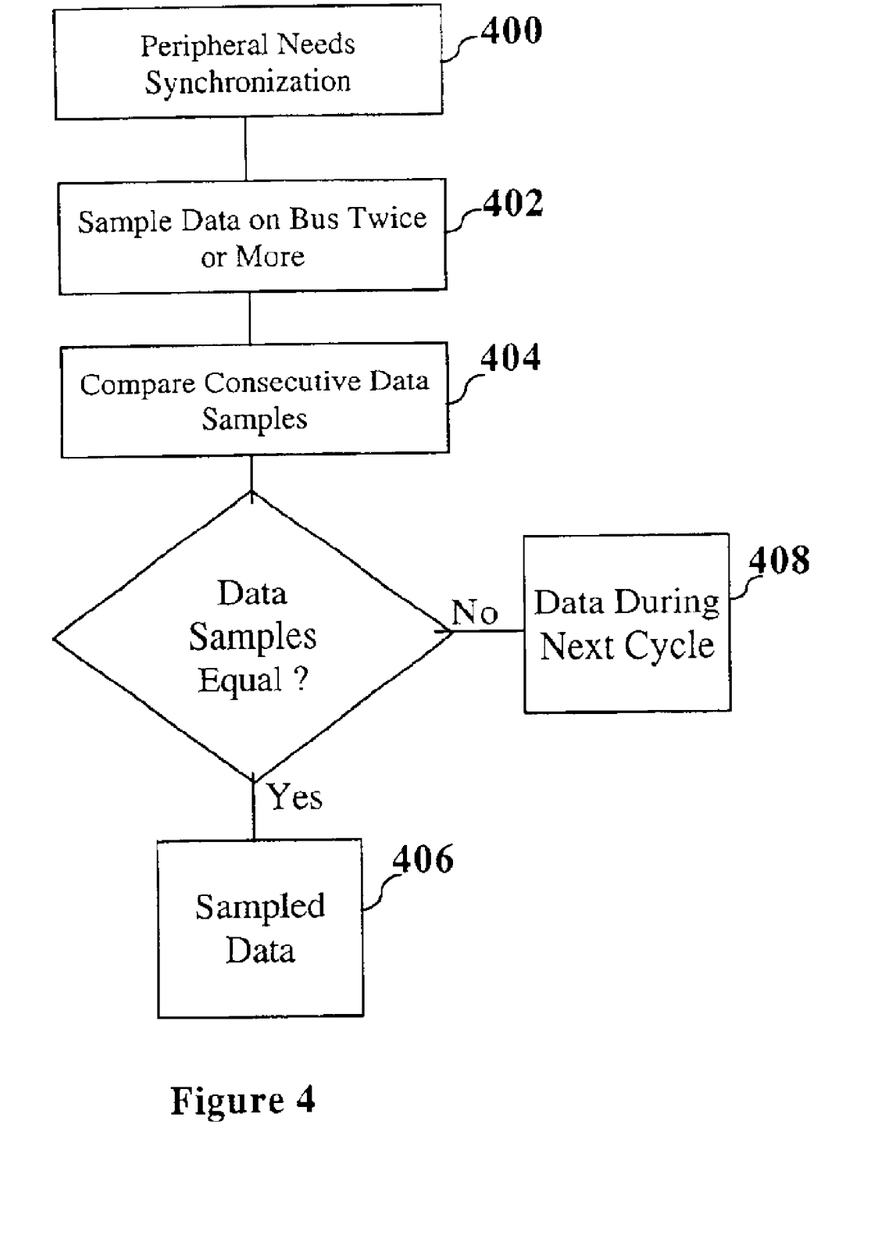
FIG. 4 illustrates the method of the present invention implemented by synchronization logic.
Figure 5A:
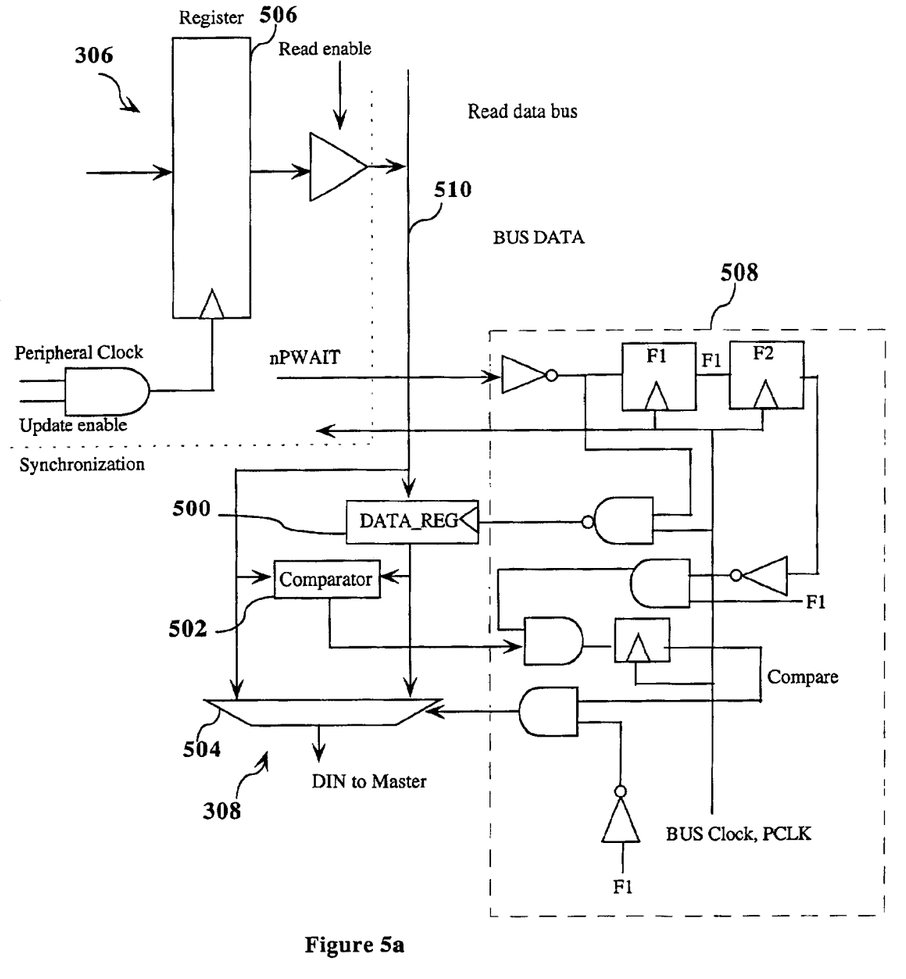
FIG. 5a illustrates one embodiment of synchronization logic that performs the method of FIG. 4.

FIG. 5a illustrates one embodiment of synchronization logic 308 that performs the method of FIG. 4. In this embodiment, the data is a set of related bits representing a single piece of information, e.g. a data word. These bits are kept coherent in order to have valid information. While not shown, embodiments in which the data is a combination of independent bits is envisioned within the scope of the present invention. In this case, there is no need to keep coherence between the bits and they can be changed independently. Similarly, while a register with a gated clock is illustrated as the mechanism for placing data on the bus, other implementations of doing so are envisioned. For example, a register with a feedback multiplexor, an individual register with its own clock for each bit, or an ungated clock can be used. Likewise, even though the bus is illustrated as a tri-state bus, one of skill in the art would appreciate that any type of bus is within the scope of the present invention.

When a read transaction is initiated (e.g., by a Read Enable signal provided by bus master 304), a signal, nPWAIT, is provided from peripheral 306 to bus interface logic 300 to inform bus interface logic 300 that peripheral 306 is asynchronous and, consequently, synchronization needs to be performed. In many bus systems, a signal is also used to extend the duration of the read access for slow peripherals, i.e. for peripherals that run at a lower frequency or for any other reason do not have their data ready within one bus clock cycle. The illustrated embodiment of synchronization logic 308 combines the use of nPWAIT to inform bus interface logic that synchronization needs to be performed and to extend the read access duration.

Rather than using a read buffer in peripheral 306, data is driven from a register 506 directly to a peripheral bus 510 upon a read access. Also upon a read access, peripheral 306 sends the nPWAIT signal LOW. When peripheral 306 needs to extend the duration of the read access, nPWAIT is sent low for the number of bus clock cycles peripheral 306 needs the read access extended. When peripheral 306 only needs to inform bus interface logic 300 that synchronization is needed, nPWAIT is sent LOW for one bus clock cycle. In this case the peripheral bus access lasts 3 bus clock cycles.

When peripheral 306 indicates that synchronization is needed, bus interface logic 300 performs synchronization using synchronization logic 308. Synchronization logic 308 comprises a data register 500 connected to peripheral bus 510, a comparator with one input connected to peripheral bus 510 and the other input connected to the output of data register 500 and a multiplexor 504 for choosing between peripheral bus 510 and the output of data register 500 as the input, DIN, to bus master 304. The input DIN is provided to a register (not shown) that bus master 304 uses to sample in the data from peripheral 306. Synchronization logic 308 also comprises logic 508 for controlling the operation of data register 500, comparator 502 and multiplexor 504 to implement the method illustrated in FIG. 4.

Figure 5B:
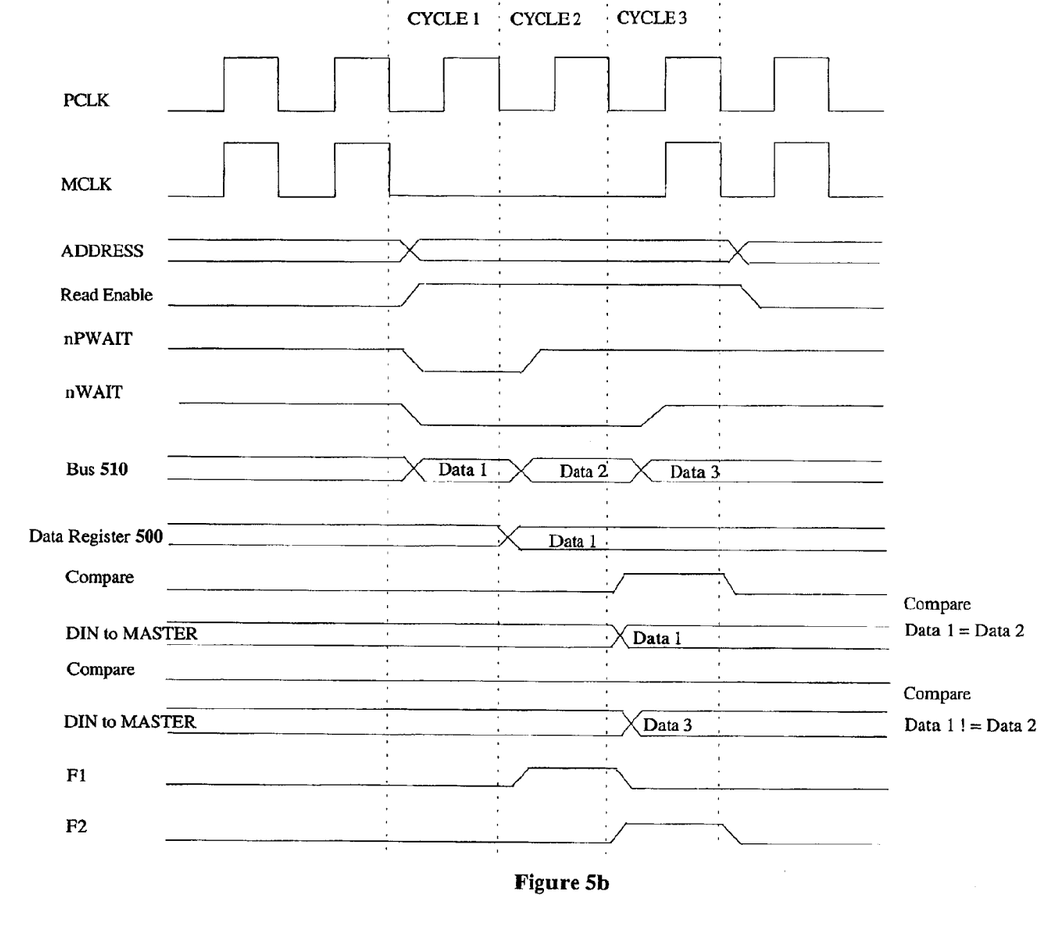
FIG. 5b illustrates timing waveforms for nPWAIT deasserted for one bus clock cycle.

Operation of synchronization logic 508 is discussed in conjunction with FIG. 5b, which illustrates timing waveforms for nPWAIT deasserted for one bus clock cycle. While the bus clock, PCLK, is shown as having the same frequency and phase relationship as the bus master's clock, MCLK, this is not necessary. At times, there may be a slight skew between these two clocks, or the PCLK may be divided from MCLK, therefore having a slower frequency, depending upon the system implementation. As shown, during a read access, nPWAIT is deasserted during the first bus clock cycle of the read. When NPWAIT is deasserted, the data placed on bus 510 during the first bus cycle, Data 1, is read into data register 500 at the end of the first bus clock cycle. Comparator 502 compares the data on bus 510 during the second bus clock cycle, Data 2, with Data 1 in data register 500. At the beginning of the third bus clock cycle, the result of comparator 502 is used to control multiplexor 504 to output either Data 1 from data register 500 or to output the data on bus 510 during the third bus clock cycle. As can be seen, when Data 1 is equal to Data 2, the output of data register 500 (i.e. Data 1) is output by multiplexor 504 as the input, DIN, to bus master 304. However, when Data 1 is not equal to Data 2, the data on bus 510 is output by multiplexor 504 as the input, DIN, to bus master 304.

Bus interface logic 308 provides a wait signal, nWAIT, that places bus master 306 into a wait state until DIN is valid. The signal nWAIT places bus master 306 into a wait state in any appropriate manner, such as disabling the bus master's clock or preventing bus master 306 from progressing to the next state by performing NOPs.

Figure 5C:
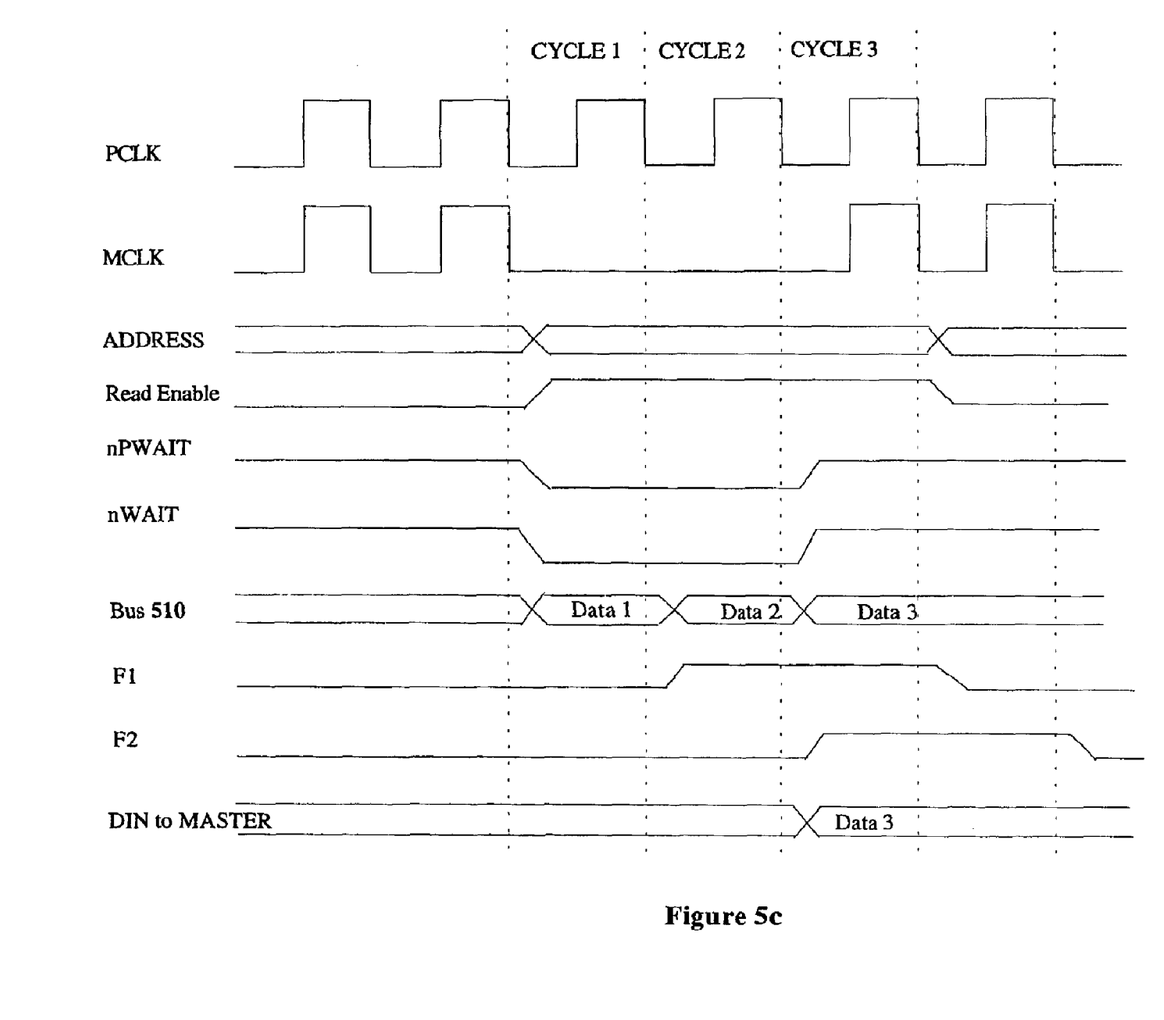
FIG. 5c illustrates timing waveforms when nPWAIT is deasserted for more than one clock cycle by an asynchronous peripheral to extend the duration of the read access.

FIG. 5c illustrates timing waveforms when nPWAIT is deasserted for more than one clock cycle by peripheral 306 to extend the duration of the read access. As shown, when nPWAIT is deasserted for more than one bus clock cycle, the data output by multiplexor 504 as DIN is the data on bus 510 on the last cycle of the access (i.e. the cycle following rising edge of nPWAIT).

While nPWAIT has been shown as indicating the need for synchronization and used to extend a read access, it is possible to use two separate signals for each function. Further, it is also possible to eliminate the need for a signal to indicate that the peripheral is asynchronous. By maintaining a list of which peripherals are asynchronous and automatically implementing the present invention for those peripherals, the bus interface logic can still perform synchronization without the need for a signal to indicate synchronization is needed.

Although the present invention has been shown and described with respect to a preferred embodiment thereof, various changes, omissions and additions to the form and detail thereof, may be made therein, without departing from the spirit and scope of the invention.

What is claimed is:

1. A circuit for providing synchronized transportation of data from a first device having a first clock domain to a second device having a second clock domain, the circuit comprising:
    a data register to sample data placed on a data bus by the first device during a first bus clock cycle;
    a comparator to compare data on the data bus during a second, consecutive bus clock cycle to the data sampled by the data register;
    a multiplexor to output the sampled data to the second device during a third, consecutive bus cycle when the sampled data is equal to the data on the data bus during the second, consecutive bus clock cycle and to output data on the data bus to the second device during the third, consecutive bus clock cycle when the sampled data is not equal to the data on the data bus during the second bus clock cycle.

2. A circuit for providing synchronized transportation of data from a first device having a first clock domain to a second device having a second clock domain, as per claim 1, wherein the first device is an asynchronous peripheral in a computer system and the second device is a bus master.

3. A circuit for providing synchronized transportation of data from a first device having a first clock domain to a second device having a second clock domain, as per claim 1, wherein the first device is maintained in a list indicating that synchronization is needed when data is transported to the second device and the circuit automatically performs synchronization when the data is transported to the second device.

4. A circuit for providing synchronized transportation of data from a first device having a first clock domain to a second device having a second clock domain, as per claim 1, wherein the first device provides a signal to the circuit to indicate that synchronization is needed when the data is transported to the second device.

5. A circuit for providing synchronized transportation of data from a first device having a first clock domain to a second device having a second clock domain, as per claim 1, wherein the first device provides a signal that indicates a duration of time for transporting data to the second device needs extended.

6. A circuit for providing synchronized transportation of data from a first device having a first clock domain to a second device having a second clock domain, as per claim 1, wherein the first device provides to the circuit a single signal used to both indicate that synchronization is needed and to indicate a duration of time for transporting data to the second device needs extended.

7. A method for providing synchronized transportation of data from a first device having a first clock domain to a second device having a second clock domain, the method comprising:
    sampling data placed on a data bus by the first device during a first bus clock cycle;
    comparing data on the data bus during a second consecutive bus clock cycle to the sampled data;
    for the sampled data equal to the data on the data bus during a second consecutive bus clock cycle, outputting the sampled data to the second device during a third consecutive bus cycle; and
    for the sampled data not equal to the data on the data bus during the second consecutive bus clock cycle, outputting data on the data bus during the third consecutive bus clock cycle to the second device.

8. A method for providing synchronized transportation of data from a first device having a first clock domain to a second device having a second clock domain, as per claim 7, wherein the first device is an asynchronous peripheral in a computer system and the second device is a bus master.

9. A method for providing synchronized transportation of data from a first device having a first clock domain to a second device having a second clock domain, as per claim 7, wherein the first device is maintained in a list indicating that synchronization is needed when data is transported to the second device and the circuit automatically performs synchronization when the data is transported to the second device.

10. A method for providing synchronized transportation of data from a first device having a first clock domain to a second device having a second clock domain, as per claim 7, wherein the first device provides a signal to the circuit to indicate that synchronization is needed when the data is transported to the second device.

11. A method for providing synchronized transportation of data from a first device having a first clock domain to a second device having a second clock domain, as per claim 7, wherein the first device provides a signal that indicates a duration of time for transporting data to the second device needs extended.

12. A method for providing synchronized transportation of data from a first device having a first clock domain to a second device having a second clock domain, as per claim 7, wherein the first device provides to the circuit a single signal used to both indicate that synchronization is needed and to indicate a duration of time for transporting data to the second device needs extended.

13. A computer comprising:
   an asynchronous peripheral that transmits read data to a bus master by placing the read data on a peripheral bus;
   bus interface logic to synchronize the read data, the bus interface logic comprising:
   a data register to sample read data on the peripheral bus during a first bus clock cycle;
   a comparator to compare read data on the peripheral bus during a second consecutive bus clock cycle to the sampled read data; and
   a multiplexor to output the sampled read data during a third consecutive bus cycle when the sampled read data is equal to the read data on the data bus during a second consecutive bus clock cycle and to output read data on the data bus during the third consecutive bus clock cycle when the sampled read data is not equal to the read data on the data bus during a second consecutive bus clock cycle.

14. A computer, as per claim 13, wherein the peripheral is maintained in a list indicating that synchronization is needed for a read access and the bus interface logic automatically performs synchronization when a read access is performed.

15. A computer, as per claim 13, wherein the peripheral provides a signal to the bus logic to indicate that synchronization is needed when a read access is performed.

16. A computer, as per claim 13, wherein the peripheral provides a signal that indicates a duration of time for transporting data to the second device needs extended.

17. A computer, as per claim 13, wherein the peripheral provides to the bus logic a single signal used to both indicate that synchronization is needed and to indicate a duration of time for transporting data to the second device needs extended.

* * * * *